US009480367B2

(12) United States Patent
Reed

(10) Patent No.: US 9,480,367 B2
(45) Date of Patent: Nov. 1, 2016

(54) RING APPARATUS AND GRAB BAR

(71) Applicant: Joseph W. Reed, Knoxville, TN (US)

(72) Inventor: Joseph W. Reed, Knoxville, TN (US)

( * ) Notice: Subject to any disclaimer, the term of this patent is extended or adjusted under 35 U.S.C. 154(b) by 0 days.

(21) Appl. No.: 14/666,593

(22) Filed: Mar. 24, 2015

(65) Prior Publication Data

US 2016/0278589 A1 Sep. 29, 2016

(51) Int. Cl.
| A47K 3/00 | (2006.01) |
| A47K 17/02 | (2006.01) |
| E04H 4/14 | (2006.01) |
| A47K 3/28 | (2006.01) |
| F16B 2/10 | (2006.01) |
| F16M 13/02 | (2006.01) |

(52) U.S. Cl.
CPC ............ *A47K 3/003* (2013.01); *A47K 3/281* (2013.01); *A47K 17/022* (2013.01); *E04H 4/14* (2013.01); *F16B 2/10* (2013.01); *F16M 13/02* (2013.01)

(58) Field of Classification Search
CPC .... A47K 17/022; A47K 3/003; A47K 3/281; E04H 4/14; A47B 95/02; F16B 2/10; F16M 13/02
USPC ........ 248/251, 230.2, 227.4, 229.13, 229.23, 248/230.4, 231.51, 345.1; 4/576.1; 211/105.1; 16/431, 436, 421
See application file for complete search history.

(56) References Cited

U.S. PATENT DOCUMENTS

| 1,303,224 A | | 5/1919 | Achtmeyer | |
| 1,969,958 A | * | 8/1934 | Alder | A47K 3/003 16/DIG. 2 |
| 2,466,719 A | | 4/1949 | MacKearnin | |
| 3,740,799 A | | 6/1973 | Earle | |
| 4,639,979 A | * | 2/1987 | Polson | A63B 21/0728 24/273 |
| 4,955,914 A | * | 9/1990 | Caniglia | A61J 17/02 606/235 |
| 4,971,318 A | * | 11/1990 | Tracy | A63B 21/0728 482/107 |
| 5,190,267 A | | 3/1993 | Schmitt et al. | |
| 5,259,824 A | * | 11/1993 | Cheltenham | A63B 21/00047 482/114 |
| 5,280,735 A | | 1/1994 | Kuipers et al. | |
| 5,300,002 A | * | 4/1994 | Freye | A63B 23/12 482/114 |
| 5,306,217 A | * | 4/1994 | Bracone | A63B 1/00 4/496 |
| 5,415,607 A | * | 5/1995 | Carpenter | A63B 21/0728 482/106 |
| 5,465,437 A | * | 11/1995 | Herman | A47K 3/122 297/344.24 |
| 5,469,601 A | | 11/1995 | Jackson | |
| 5,659,904 A | | 8/1997 | Doczy et al. | |
| 5,690,237 A | * | 11/1997 | Marzec | A47K 3/003 211/105.1 |

(Continued)

OTHER PUBLICATIONS

Ocelco Healthcare Equipment & Parts, Med-Grip Non-Slip Cover for Grab Bars, http://www.ocelco.com, Accessed Sep. 24, 2014.

(Continued)

*Primary Examiner* — Anita M King
(74) *Attorney, Agent, or Firm* — Luedeka Neely Group, P.C.

(57) ABSTRACT

A safety grab bar and grab bar ring sized and configured to removably mount around the safety grab bar to assist in preventing a user's hand from sliding along the grab bar. The grab bar ring has a first ring and second ring, which are connected together and are sized and configured to removably mount around the safety grab bar. Gaskets are located on inside surfaces of the first and second rings. The gaskets are configured to contact a portion of the safety grab bar. One side of the first and second rings is rotatably joined together by a hinge connection. The opposite side of the first and second rings is removably joined together by a latch connection. An external surface of the first and second rings may include surface texturing or a non-slip surface. Multiple grab bar rings may be mounted to a single grab bar.

18 Claims, 2 Drawing Sheets

(56) References Cited

U.S. PATENT DOCUMENTS

| | | | |
|---|---|---|---|
| 5,775,756 | A | 7/1998 | Rozenich |
| 5,867,868 | A | 2/1999 | Ward |
| 7,040,642 | B2 | 5/2006 | Lowry |
| 7,712,394 | B2 | 5/2010 | Wu |
| 7,736,284 | B1 * | 6/2010 | Andrews ............... A63B 21/072 482/108 |
| D726,891 | S * | 4/2015 | Portilla ......................... D23/304 |
| 2001/0052710 | A1 * | 12/2001 | Witherell ............. A63B 21/072 294/137 |
| 2005/0217017 | A1 | 10/2005 | Moser |
| 2010/0197470 | A1 * | 8/2010 | Hartman ............ A63B 21/4017 482/139 |
| 2010/0253074 | A1 | 10/2010 | Gershkovich et al. |
| 2016/0025271 | A1 * | 1/2016 | Linge ........................ F21K 2/00 362/253 |

OTHER PUBLICATIONS

Avon Grips, Air Cushion Chrome, http://www.avongrips.com, Accessed Sep. 24, 2014.
Grab Bar Specialists, HMI-Med-Grip, http://www.grabbarspecialists.com, Accessed Sep. 19, 2014.
Croydex Co. Ltd., Grab N Grip Angled Grab Bar, http://www.croydex.com, Accessed Sep. 19, 2014.
Kickstarter, GripRings: A bicycle grip made of individual silicone rings, http://www.kickstarter.com, Accessed Sep. 24, 2014.
Heskins, H3418 Handrail Grip Tape, http://www.heskins.com/handrail-grip-tape, Accessed Sep. 24, 2014.
Pool X Perts USA, Safety Grip Pool Handrail Covers, Accessed Sep. 18, 2014.
DLF Data, Prima Grab Bars, http://www.dlf-data.org.uk, Accessed Sep. 19, 2014.

* cited by examiner

RING APPARATUS AND GRAB BAR

FIELD

This invention relates to the field of safety railing and grab bars and, in particular, to a grab bar ring mounted to a grab bar to prevent a user's hand from sliding on the grab bar.

BACKGROUND

Safety rails, grab bars and the like, generally denoted herein as grab bars, are often placed into wet environments, such as bathrooms and swimming pools, as a safety mechanism to assist users to safely enter and exit those environments. For example, grab bars may be placed along the wall of a shower or near steps leading into a swimming pool. However, one problem is that, due to the wet environment, these devices often become slippery and the user's hand is more likely to slide along the grab, which may result in an injury to the user. What is needed, therefore, is device for improving the safety of grab bars in wet environments and that will reduce the likelihood of a user's hand slipping along the grab bar when it becomes wet.

SUMMARY

The above and other needs are met by a safety grab bar and a grab bar ring sized and configured to removably mount around the safety grab bar. The grab bar ring has a first half ring and a second half ring. The first half ring has a first top end and a first bottom end; a first inside surface and a first outside surface; and a first left mating surface and a first right mating surface. A first gasket is located on the first inside surface and is configured to contact the safety grab bar. Similarly, the second half ring has a second top end and a second bottom end; a second inside surface and a second outside surface; and a second left mating surface and a second right mating surface. A second gasket is located on the second inside surface and configured to contact the safety grab bar. A hinge connection is provided for rotatably connecting the first left mating surface to the second left mating surface, and a latch connection is provided for removably connecting together the first right mating surface to the second left right mating surface.

BRIEF DESCRIPTION OF THE DRAWINGS

Further advantages of the invention are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
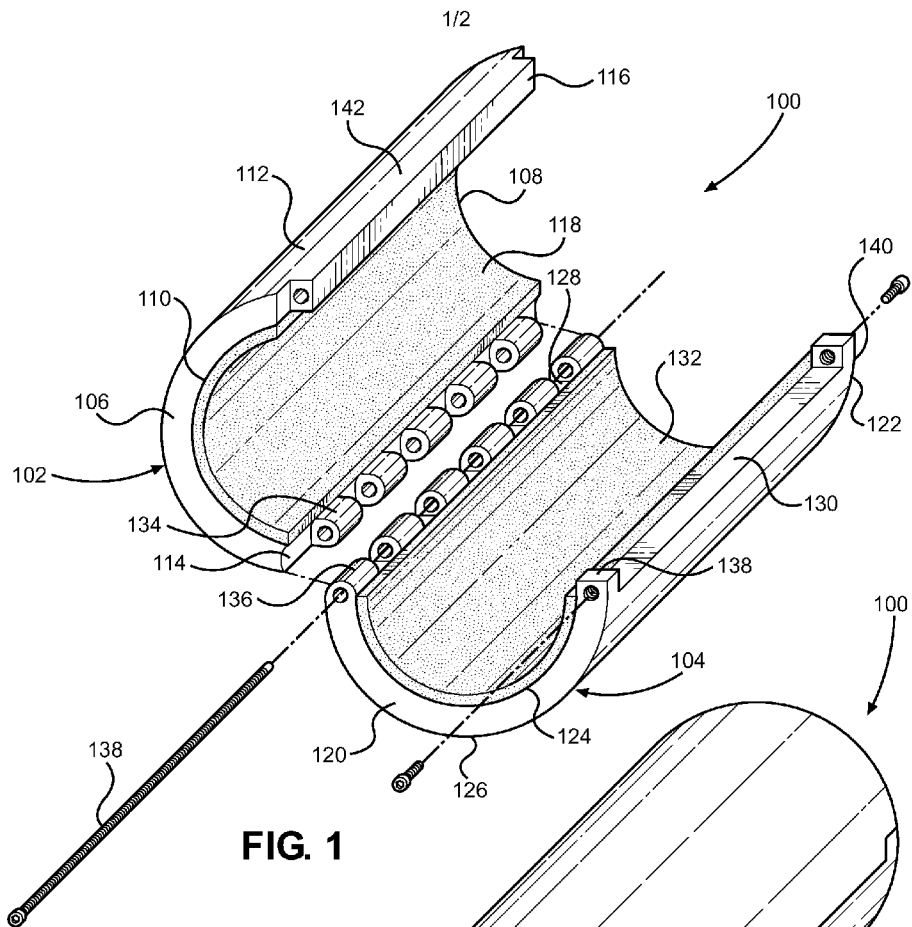
FIG. 1 depicts a grab bar ring according to an embodiment of the present invention shown in an open position.
Figure 2:
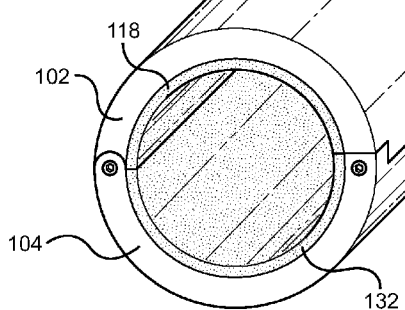
FIG. 2 depicts the grab bar ring of FIG. 1 in a closed position.
Figure 3:
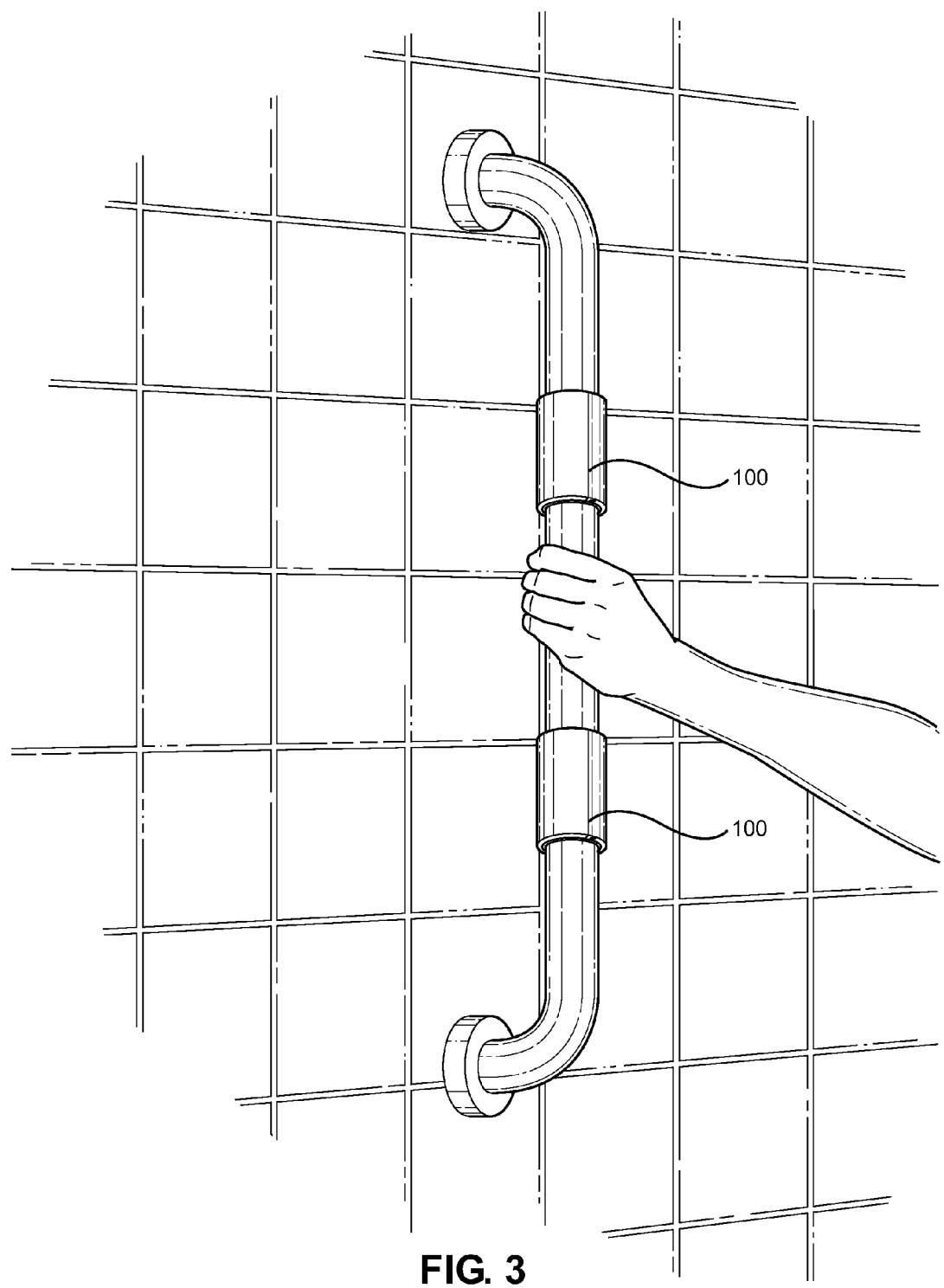
FIG. 3 depicts two grab bar rings secured around a safety grab bar.

FIGS. 1 and 2 depict a grab bar ring 100 that is configured to be removably mounted around a portion of a safety grab bar. The grab bar ring 100 generally includes a first half ring 102 and a second half ring 104. The ring halves 102, 104 are designed to fit snugly around the grab bar in and to provide an additional gripping surface. Preferably, a number of grab bar rings are fitted onto each grab bar in order to provide a number of gripping surfaces and to limit the distance that a user's hand may slide along the grab bar before contacting a grab bar ring.

The first ring half 102 includes a first top end 106 and a first bottom end 108. The inside of the first ring half 102 forms a first inside surface 110 and the outside forms a first outside surface 112. A first left mating surface 114 is formed between the first inside surface 110 and the first outside surface 112. A first right mating surface 116 is also formed between the first inside surface 110 and the first outside surface 112 and opposite from the first left mating surface 114. A first gasket 118 is disposed on the first inside surface 110 and is configured to contact one half of the safety grab bar. Preferably, the first gasket 118 extends substantially from the first top end 106 to the first bottom end 108 and also from the first left mating surface 114 to the first right mating surface 116.

The second ring half 104 includes a second top end 120 and a second bottom end 122. The inside of the second ring half 104 forms a second inside surface 124 and the outside forms a second outside surface 126. A second left mating surface 128 is formed between the second inside surface 124 and the second outside surface 126. A second right mating surface 130 is also formed between the second inside surface 124 and the second outside surface 126 and opposite from the second left mating surface 128. A second gasket 132 is disposed on the second inside surface 124 and is configured to contact the half of the safety grab bar that is opposite from the first gasket 118. Preferably, the second gasket 132 extends substantially from the second top end 120 to the second bottom end 122 and also from the second left mating surface 128 to the second right mating surface 130.

The first and second ring halves 102, 104 may be formed from a variety of solid materials that are preferably well suited for a wet environment. For example, the rings may be formed of metals, such as stainless steel, or plastics or hard rubbers. The first and second outside surfaces 112, 126 may include a textured surface in order to provide for improved gripability. Alternatively, the external surface may be partially or fully covered with a suitable non-slip material, such as rubber, in order to provide improved gripability and reduce sliding. The precise configuration of the non-slip surface may be changed in order to provide an optimal gripping surface. For example, the outside surfaces 112, 126 may include non-slip strips in certain embodiments or the entire outside surface may be covered in a non-slip material in other embodiments. Additionally, each ring half 102, 104 preferably has sufficient thickness, the distance from the inside surface 110, 124 to the outside surface 112, 126, so that a hand on the grab bar can slide to the grab bar ring 100 and be stopped from sliding.

The ring halves 102, 104 are sized and configured to be snugly fitted onto the grab bar so that they do not slide along the grab bar when it is gripped by a user. The inside diameter of the ring halves 102, 104 is roughly the same size as the exterior diameter of the grab bar. The overall length of the ring halves 102, 104 (i.e., the distance the halves extend along the grab bar) may vary from about one inch to several inches in length. However, preferably the ring halves 102, 104 are around 1 inch in length. The thickness of the ring halves 102, 104 is the distance that the ring material extends away from the outer surface of the grab bar. The thickness of the ring halves 102, 104 should be sufficient to stop a user's hand from sliding on the grab bar and may vary from about ¼" to about 3 inches. The gaskets 118, 132 located on the first and second inside surfaces 110, 124, which are also made from a suitable non-slip material such as rubber, are configured to engage the grab bar. When the ring halves 102, 104 are mounted to the grab bar, the gaskets 118, 132 are preferably compressed slightly in order to provide a secure fit.

The two ring halves 102, 104 may be joined with a slide connection or a hinged connection to enable the ring halves to facilitate fitting and removing the ring halves from the grab bar. In this particular embodiment, a hinge connection connects the first and second left mating surfaces 114, 128. In particular, a set of first hinge members 134 extending away from the first left mating surface 114 are configured to mesh with corresponding second hinge members 136 extending away from the second left mating surface 128. A rod 138 is inserted through openings in the hinge members 134, 136 to hold them in place.

Once the ring halves 102, 104 are hinged around the grab bar, they are secured to the grab bar. In particular, a latch connection is provided for removably connecting the first right mating surface 116 together with the second left right mating surface 130. This hinge connection may comprise snaps, clasps, magnets, or any other suitable latching mechanism. In this particular embodiment, a top tab 138 and a bottom tab 140 extend away from the second right mating surface 130 proximate the second top end 120 and a second bottom end 122 of the second ring half 104, respectively. A center tab 142 extends away from the first right mating surface 116 of the first ring half 102 between the first top end 106 and a first bottom end 108. When the first and second half rings 102, 104 are in a closed position, the center tab 142 is configured to contact the second right mating surface 130 and to rest between the top and bottom tabs 138, 140. Openings are provided in the top tab 138, center tab and bottom tab 142 and are configured to receive a connector, such as a threaded connector or rivet. In the embodiment shown, separate threaded openings are provided at the top and bottom ends of the grab bar ring 100. Accordingly, to latch the ring halves 102, 104 together, one threaded connector is inserted through the top tab 138 and then into the center tab 142 and a second threaded connector is inserted through the bottom tab 140 and then into the center tab 142. In an alternative embodiment, a single connector may be used to connect the top tab 138, bottom tab 140 and center tab 142 together.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A safety apparatus comprising:
    a stationary safety grab bar fixedly mounted to a surface;
    a grab bar ring sized and configured to removably mount at a selected location around the safety grab bar such that the grab bar ring remains stationary after being mounted to the safety grab bar, the grab bar ring having:
        a first half ring having:
            a first top end and a first bottom end;
            a first inside surface and a first outside surface
            a first left mating surface and a first right mating surface;
            a first gasket material disposed on the first inside surface and configured to contact the safety grab bar;
        a second half ring having:
            a second top end and a second bottom end;
            a second inside surface and a second outside surface
            a second left mating surface and a second right mating surface;
            a second gasket material disposed on the second inside surface and configured to contact the safety grab bar;
        a hinge connection for rotatably connecting the first left mating surface to the second left mating surface;
        a latch connection for removably connecting together the first right mating surface to the second right mating surface; and
        hand contact surfaces formed at ends of the grab bar ring sized to arrest movement of a hand sliding along the bar.

2. The safety apparatus of claim 1 wherein the latch connection includes:
    a top tab disposed at the second top end;
    a bottom tab disposed at the second bottom end;
    a center tab disposed between the first top end and the first bottom end and configured to removably engage the second right mating surface between the top tab and the bottom tab;
    openings extending at least partially through the top, bottom and center tabs;
    at least one connector configured for insertion into the openings to removably connect together the right mating surfaces of the first and second ring halves.

3. The safety apparatus of claim 2 wherein the openings comprise threaded openings and wherein the at least one connector comprises a threaded connector configured to mesh with the threaded openings.

4. The safety apparatus of claim 1 comprising a plurality of grab bar rings configured to fixedly mount in spaced apart arrangement along the safety grab bar.

5. An improvement in a safety grab bar, the improvement comprising:
    a grab bar ring sized and configured to removably clamp around the safety grab bar such that the grab bar ring remains stationary after being mounted to the safety grab bar, the grab bar ring having:
    a first semicircular half ring having a first inside surface and left and right sides:
    a first gasket material disposed on the first inside surface and configured to contact the safety grab bar;
    a second semicircular half ring having a second inside surface and left and right sides:
    a second gasket material disposed on the second inside surface and configured to contact the safety grab bar;
    a first connector for connecting the left sides of the first and second half rings together;
    a second connector for connecting the rights sides of the first and second half rings together;

hand contact surfaces formed at ends of the grab bar ring sized to arrest movement of a hand sliding along the bar.

6. The improvement of claim 5 wherein the first connector is a hinging connector that enables the right side of the first and second ring halves to rotate away from one another about the left side.

7. The improvement of claim 5 wherein the hinging connector has:
one or more first hinge members extending away from the left side of the first half ring, each of the one or more first hinge members having an opening;
one or more second hinge members extending away from the left side of the second half ring and configured to mesh with the one or more first hinge members, each of the one or more second hinge members having an opening; and
a rod configured for simultaneous insertion through the opening of the first and second hinge members.

8. The improvement of claim 5 wherein the second connector has:
a first tab extending away from the right side of the first half ring, first tab including an opening;
a second tab extending away from the right side of the second half ring, the second tab including an opening; and
a connection member configured for insertion into the opening of the first and second tabs and to removably fix the first and second tabs together.

9. The improvement of claim 8 wherein at least a portion of the opening in the first tab or second tab is threaded and wherein at least a portion of the connection member is threaded.

10. The improvement of claim 5 wherein each of the first and second half rings have an outside surface and wherein the outside surface of at least one of the first and second half rings has a non-slip surface.

11. The improvement of claim 10 wherein the non-slip surface is comprised of surface texturing.

12. The improvement of claim 10 wherein the non-slip surface is comprised of a non-slip material applied onto the outside surface.

13. The improvement of claim 12 wherein the non-slip material includes rubber.

14. A safety ring apparatus comprising:
a fixedly mounted stationary safety grab bar;
a first grab bar ring formed by first and second ring halves that may be selectively connected together and fixedly mounted at a first location along the safety bar to provide hand stop surfaces located on first and second outer ends of the first grab bar ring sized and configured to be contacted by a hand, wherein the safety ring is configured to remain stationary on the safety bar at the first location and the hand stop surfaces are each sized to arrest movement of the hand sliding along the stationary safety bar once the hand contacts the hand stop surface located at either end of the first grab bar.

15. The apparatus of claim 13 further comprising a second grab bar ring fixedly mounted at a second location along the safety bar spaced apart from the first grab bar ring.

16. The apparatus of claim 13 wherein a first side of the first and second ring halves are hingedly mounted together.

17. The apparatus of claim 13 wherein each of the first and second ring halves has a non-slip bar contact surface that is configured to contact the safety grab bar when the halves are connected together.

18. The apparatus of claim 16 wherein the non-slip contact surface is sized and configured to contact the safety grab bar and to be at least partially compressed when the first and second ring haves are connected together.

\* \* \* \* \*